United States Patent
Marshall et al.

(10) Patent No.: US 7,105,947 B1
(45) Date of Patent: Sep. 12, 2006

(54) METHOD AND SYSTEM FOR VOLTAGE TRACKING AND SEQUENCING IN A POWER SUPPLY

(75) Inventors: Robert A. Marshall, Georgetown, TX (US); Carlos A. Salinas, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 390 days.

(21) Appl. No.: 10/443,911

(22) Filed: May 21, 2003

(51) Int. Cl.
*H02J 1/10* (2006.01)
*H02J 3/14* (2006.01)
*H02J 3/00* (2006.01)
*H02J 1/00* (2006.01)

(52) U.S. Cl. .............. 307/28; 307/34; 307/75; 307/82

(58) Field of Classification Search ............ 307/28, 307/34, 75, 82
See application file for complete search history.

(56) References Cited

U.S. PATENT DOCUMENTS

| | | | | |
|---|---|---|---|---|
| 3,740,569 A | * | 6/1973 | Carcia ................ | 307/11 |
| 4,488,060 A | * | 12/1984 | Simko ................ | 327/170 |
| 4,652,769 A | * | 3/1987 | Smith et al. ........ | 307/31 |
| 4,733,389 A | | 3/1988 | Puvogel .............. | 370/5 |
| 5,307,001 A | * | 4/1994 | Heavey ............... | 320/125 |
| 5,324,989 A | * | 6/1994 | Thornton ............. | 307/35 |
| 5,406,260 A | | 4/1995 | Cummings et al. .... | 340/568 |
| 5,534,768 A | * | 7/1996 | Chavannes et al. ... | 323/267 |
| 5,811,962 A | | 9/1998 | Ceccherelli et al. . | 323/282 |
| 5,952,733 A | * | 9/1999 | Johnston ............. | 307/44 |
| 6,429,706 B1 | | 8/2002 | Amin et al. .......... | 327/143 |
| 6,459,275 B1 | | 10/2002 | Ewalt et al. ......... | 324/539 |
| 6,462,438 B1 | | 10/2002 | Stapleton et al. .... | 307/130 |
| 6,841,897 B1 | * | 1/2005 | Priest ............... | 307/52 |
| 6,897,636 B1 | * | 5/2005 | Harris .............. | 323/272 |

OTHER PUBLICATIONS

"High Power Synchronous Switching Regulator Controller for DDR Memory Termination," Initial Release Final Elelctrical Specifications LTC3831, *Linear Technology Corporation*, Dec. 2001, 20 pages.

Mark Long, "Power Management IC Meets DDR Memory Requirements,"*e-inSITE* EDN Access. *Reed Business Information*, found at http: www.e-insite.net at the Internet, Jan. 28, 2002, 2 pages.

"Advanced PFC PWM Combination Controllers," UCC28510, UCC28511, UCC28512, UCC28513, UCC28514, UCC28515, UCC28516, UCC28517, *Texas Instruments Incorporated*. Dec. 2002, 34 pages.

"Quad Trakking™ Bower Supply Manager." SMT4004, *Summit Microelectronics, Inc.*, Mar. 18, 2003, 36 pages.

\* cited by examiner

*Primary Examiner*—Lynn Feild
*Assistant Examiner*—Michael Rutland-Wallis
(74) *Attorney, Agent, or Firm*—Baker Botts L.L.P.

(57) ABSTRACT

A method for controlling multiple voltages in a power supply includes providing a plurality of DC to DC power converters. Each power converter includes a pulse width modulator controller having a control pin. The method also includes when a voltage supply to the power controllers reads a particular level. After the particular level is met, the method includes providing a respective rising ramp control signal to each respective control pin of the pulse width modulator controller such that each respective power converter generates desired voltage level over time characteristics.

8 Claims, 6 Drawing Sheets

METHOD AND SYSTEM FOR VOLTAGE TRACKING AND SEQUENCING IN A POWER SUPPLY

TECHNICAL FIELD OF THE INVENTION

This invention relates generally to power supplies and more particularly to a method and system for voltage tracking and sequencing in a power supply.

BACKGROUND OF THE INVENTION

Power supplies are required in most every electronic device used today. An example use of a power supply is in an Ethernet switch. Such power supplies often require multiple different power levels for various portions of the Ethernet switch. A given power level is sometimes referred to as a power rail. Such power supplies often receive one voltage level as an input, such as 12 volts and generate numerous different power levels through a plurality of power converters.

It is known that in such a power supply problems arise if the voltage levels generated by each of the power converters rise to their full level, or drop to zero upon termination, such that particular differential voltage levels between any two of the power rails reach undesired levels. Thus, techniques have been developed for both controlling the order at which power rails come up to power or terminate power, referred to as voltage sequencing, as well as controlling the relative voltage differential between any two power rails, referred to a voltage tracking. Various approaches include series element control, shunt element control, clamp diodes, enabling a lower voltage rail in response to a power good signal, and feedback based control. Each of these methods has disadvantages.

Series element control involves a voltage tracking controller, large series pass field effect transistors, and a set of multiple power supplies. The voltage tracking controller senses the output voltage and linearly controls the gate voltage to the series pass field effect transistors. This requires the series pass field effect transistors to be able to pass the entire load of the power rail with minimal voltage drop. This approach can be expensive, reduce reliability, generate heat, and consume board real estate.

Shunt element control involves monitoring a voltage delta between two rails and linearly controlling the gate from a field effect transistor shorting the two rails. The field effect transistor must be capable of handling large currents associated with shorting high current rails. Power is dissipated only during start up and shut down, unlike the series element method.

The use of clamp diodes involves simply attaching a Schottky diode between power rails. If the higher voltage rail falls below the lower rail, the load of the lower rail is increased to bring the rails down together. This approach has a problem of possible overloading of the lower voltage supply, causing undue stress. It also requires diodes large enough to clamp the rails together. The diodes are physically large and costly.

In the fourth approach, a power good signal may be used to enable a lower voltage rail. This solution is suitable for voltage sequencing, but not useful for voltage tracking. A large number of small logical elements is required.

In a feedback based control approach, a resistor divider is used off of a higher voltage rail to generate a reference for the lower voltage rail pulse width modulator. A lower voltage reference ramps up or down to follow the upper rail. This feature does not accommodate voltage margining.

SUMMARY OF THE INVENTION

A method for controlling multiple voltages in a power supply includes providing a plurality of DC to DC power converters. Each power converter includes a pulse width modulator controller having a control pin. The method also includes detecting when a voltage supply to the power controllers reaches a particular level. After the particular level is met, the method includes providing a respective rising ramp control signal to each respective control pin of the pulse width modulator controller such that each respective power converter generates desired voltage level over time characteristics.

Some embodiments of the invention provide numerous technical advantages. Some embodiments may benefit from some, none, or all of these advantages. According to one embodiment, voltage tracking and sequencing may be achieved while still allowing voltage margining, which is desirable. In addition, according to one embodiment of the invention, voltage tracking and sequencing may be performed using relatively inexpensive devices and wasting virtually no power.

Other technical advantages may be readily ascertained by one of skill in the art.

BRIEF DESCRIPTION OF THE DRAWINGS

Reference is now made to the following description taken in conjunction with the accompanying drawings, wherein like reference numbers represent like parts, in which.

DETAILED DESCRIPTION OF EXAMPLE EMBODIMENTS OF THE INVENTION

Embodiments of the invention are best understood by referring to FIGS. 1 through 6 of the drawings, like numerals being used for like and corresponding parts of the various drawings.

Figure 1:
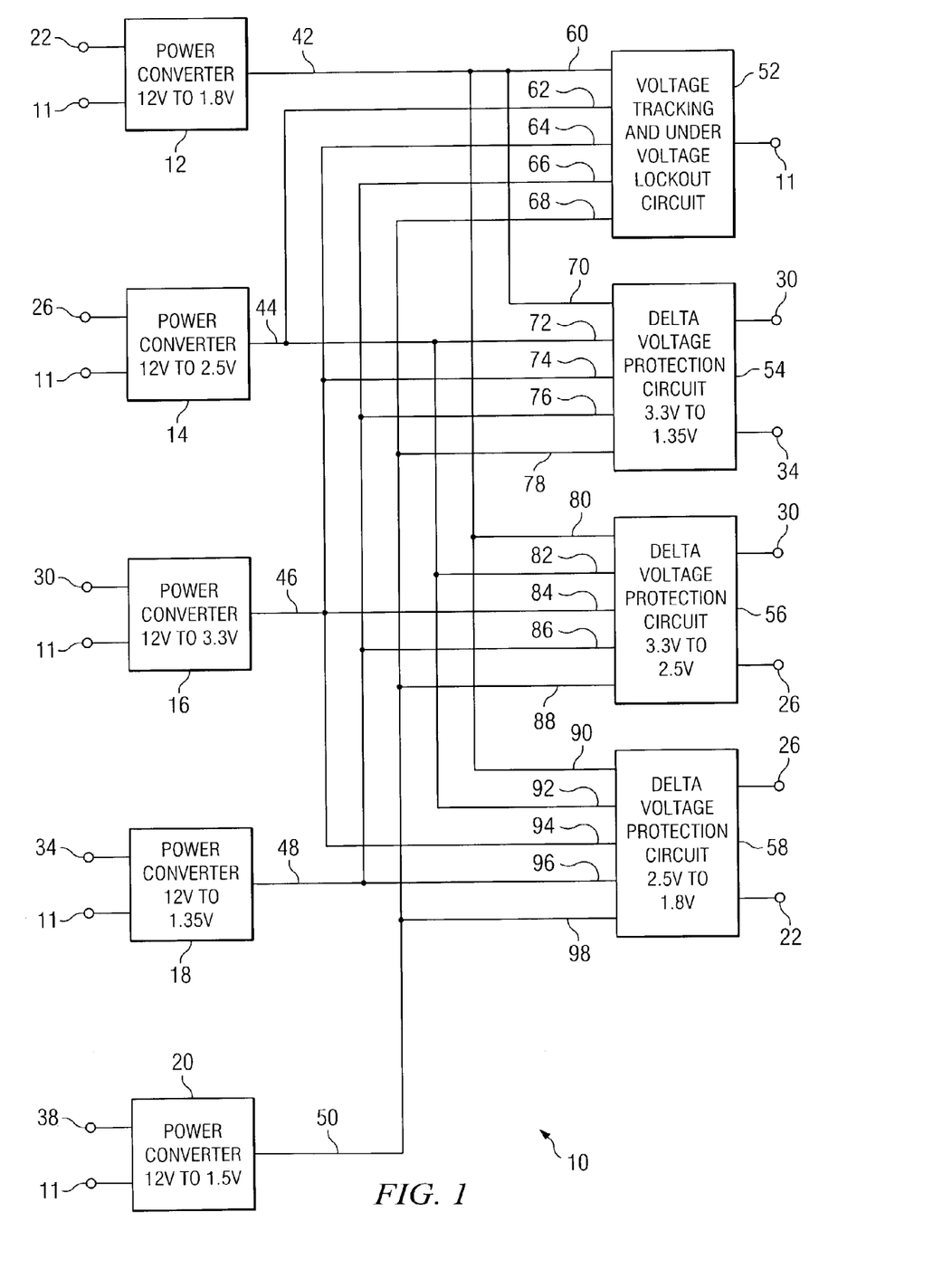
FIG. 1 is a block diagram illustrating portions of a power supply according to the teachings of the invention.

FIG. 1 is a block diagram illustrating portions of a power supply 10 according to the teachings of the invention. Power supply 10 includes a plurality of power converters 12, 14, 16, 18, and 20. In this example, five power converters are utilized and the characteristics of the power converters are as follows: Power converter 12 converts 12 volts DC to 1.8 volts DC. Power controller 14 converts 12 volts DC to 2.5 volts DC. Power controller 16 converts 12 volts DC to 3.3 volts DC. Power controller 18 converts 12 volts DC to 1.35 volts DC. Power controller 20 converts 12 volts DC to 1.5 volts DC. However, the teachings of the invention are applicable to any suitable number of converters as well as any levels of power conversion.

Each power converter receives as input twelve volts at a respective node 11 and generates a voltage at its output node. Power converter 12 generates 1.8 volt on output nodes 22. Power converter 14 generates 2.5 volts on output nodes 26. Power converter 16 generates 3.3 volts across nodes 30. Power converter 18 generates 1.35 volts on node 34. Power converter 20 generates 1.5 volts on node 38. The output node of each power converter is also referred to as a power rail.

Figure 3:
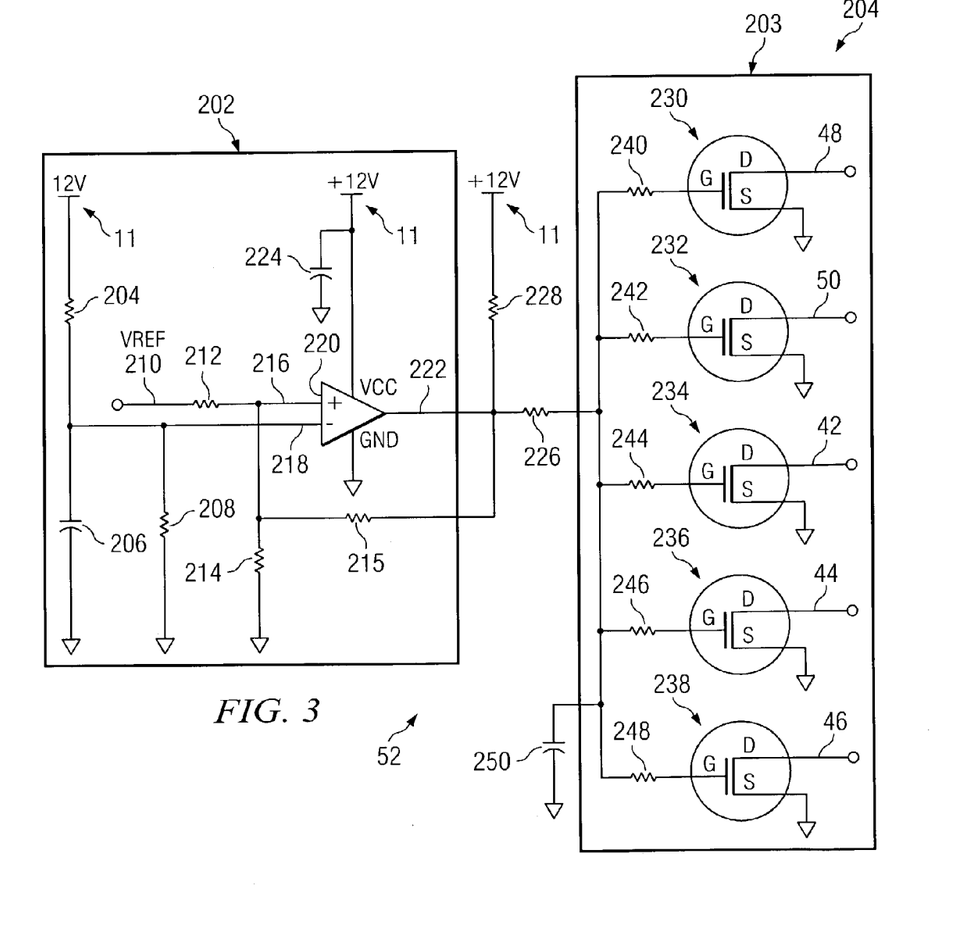
FIG. 3 is a circuit diagram illustrating the voltage tracking and sequencing circuit of FIG. 1.

Also included in power supply 10 is a voltage tracking and under voltage lockout circuit 52, and a plurality of voltage differential protection circuits 54, 56, and 58. Voltage tracking and under voltage lockout circuit 52 includes a voltage tracking circuit 203 and an under-voltage lockout circuit 202, as illustrated in FIG. 3. In the illustrated embodiment, voltage tracking circuit 203 receives a digital input from under voltage lockout circuit 202 and from voltage differential protection circuits 54, 56, and 58.

Under voltage lockout circuit 202 monitors a nominal 12 volt power supply at node 11, and based upon the detected actual level outputs appropriate control signals over lines 60, 62, 64, 66, 68 to respective ones of the power converters, as described in greater detail below in conjunction with FIG. 3. In general, however, under voltage lockout circuit 202 detects when the supplied voltage provided at node 11 reaches a predetermined level and in response initiates turning on of the power converters by providing appropriate voltage levels to each of the power converters 12, 14, 16, 18, and 20. Conversely, under voltage lockout circuit 202 initiates turning off the power converters when it determines the supplied voltage is too low.

Each of voltage differential protection circuits 54, 56, and 58 monitors voltage differentials between the rails of various pairs of power converters. In this example, voltage differential protection circuit 54 monitors nodes 30 and 34 associated with power converters 16 and 18. Voltage differential protection circuit 56 monitors nodes 30 and 26 associated with power converters 16 and 14. And voltage differential protection circuit 58 monitors nodes 26 and 22 associated with power converters 14 and 12. However, other pairs of the power converters may also be monitored. The operation of each of these voltage differential protection circuits is described in greater detail in conjunction with FIGS. 3A–3C. Generally, however, upon detection of a specified voltage differential between the monitored power rails of a particular pair of power converters, a control signal is transmitted to each respective power controller over lines 70, 72, 74, 76, and 78 by protection circuit 54 indicating each power converter should shut down in an orderly fashion to maintain tracking requirements, thereby avoiding undesirable differential voltages, which could lead to damaged load integrated circuits. Control signals are transmitted over lines 80, 82, 84, 86, and 88 for protection circuit 56. Control signals are transmitted over lines 90, 92, 94, 96, and 98 for protection circuit 58.

As described in greater detail below, both control signals transmitted to power converters 12, 14, 16, 18, and 20 by circuit 52 as well as control signals to power converters 12, 14, 16, 18, and 20 by voltage differential protection circuits 54, 56, and 58 are provided to a soft start input node of a portion of the power converters through a ramp circuit. According to the teachings of the invention, each ramp circuit is designed to have a particular time constant such that the respective power converter, through its soft start controls, either begins generating an output voltage or begins terminating an output voltage according to a particular respective voltage ramp that results in each of the power rails associated with each respective power controller ramping on or ramping off according to a desired voltage delta with respect to the other power rails. Appropriate design of the respective ramp circuits determines the respective output voltage versus time characteristics. The teachings of the invention recognize that utilization of a soft start input to a portion of the power converters enables one to control the voltage levels generated by power converters 12, 14, 16, 18, and 20, and therefore provides control of the relative voltage versus time characteristics. Additional details are described with reference to FIGS. 2 through 6.

Figure 2:
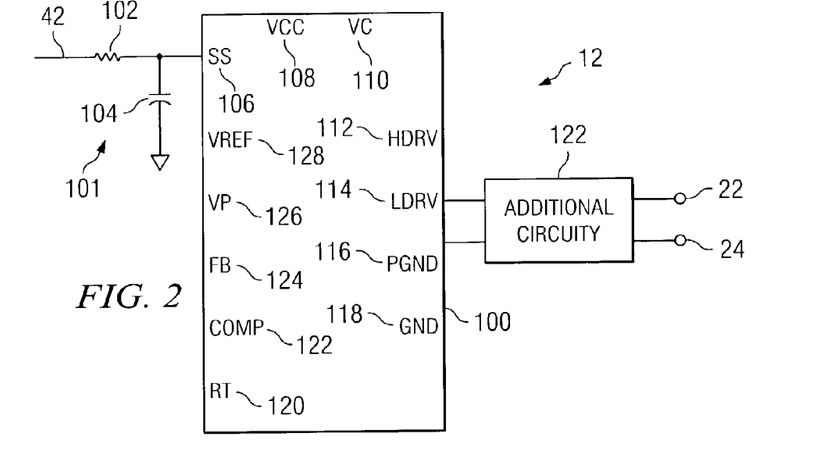
FIG. 2 is a circuit diagram illustrating portions of each of the power converters of FIG. 1.

FIG. 2 is a circuit diagram of portions of power controller 12, as an example. Power controllers 14, 16, 18, and 20 are formed similarly to power controller 12, with the differences described below. Power converter 12 includes a ramp circuit 101, a pulse width modulation controller 100, and additional circuitry 122. In general, ramp circuit 101 receives input at node 42 from voltage tracking circuit 203, which is controlled by under voltage lockout circuit 202, as well as voltage differential protection circuits 54, 56, and 58 and constant current input from soft start pin 106. For power controller 14, the corresponding ramp circuit receives input at node 44; for power controller 16, the corresponding ramp circuit receives input at node 46; for power controller 18, the corresponding ramp circuit receives input at node 48; and for power controller 20, the corresponding ramp circuit receives input at node 50.

Ramp circuit 101 ramps, for a particular time constant determined predominantly by capacitor 104, resistor 102 and current source internal to the pulse width modulation controller 100, application of a control signal to pulse width modulation controller 100, which either initiates a soft start or initiates a soft stop by pulse width modulation controller 100. Control of the level of the application of the control signal to soft start input 106 allows proportional control of the respective timing of the rise and fall of voltages on the various power rails of power supply 10. By utilizing various levels of capacitance for capacitor 104 and resistance 102 in each of the power controllers, voltage levels on each of the power rails can be raised and lowered according to desired relative timing characteristics.

Pulse width modulation controller 100 receives at a soft start input 106 either a control input to ramp up or ramp down power rail 22 associated with power converter 12. A soft start refers to generation on the output rails of a power converter of a voltage ramp that grows to the desired output. In many cases the ramp is generally linear, but in others it may be non-linear. A soft stop refers to gradually terminating the voltage of the power rails in a converse fashion. Such gradual termination often takes the form of a linear ramp. As used herein a "rising ramp" refers to a general increasing signal, such as is applied during a soft start and a "falling ramp" refers to a generally decreasing signal, such as is applied during a soft stop. In both instances the ramp may be generally linear or non-linear.

Additional circuitry 122 is provided to condition the output signal to generate a DC voltage level of 1.8 volts across nodes 22 and 24, in this example. Other portions of power controller 12 are not explicitly shown.

As illustrated, ramp circuit 101 includes a resistor 102 and a capacitor 104. In general, in one embodiment, the time constants for a soft start are selected such that the highest voltage has the fastest turn on ramp rate. The soft stop time constants are selected such that the outputs are ramped down before the 12 volt supply is fully discharged, such that the highest voltage has the highest ramp down rate, and slow enough not to cause a resonance in the output inductance and output capacitance. This is due to excessive "on" time of the bottom side FET, creating a resonance between the output inductor and output capacitors. The resonance could otherwise cause uncontrolled excessively high or negative voltages and thus be destructive to the load. Other alternative ramp circuits may be utilized to properly apply a control signal to the respective soft start input 106 of each power controller utilizing a capacitor, constant current source, inductor, constant voltage source, resistor, or other ramp circuit topology.

Pulse with modulation controller 100 may be any pulse with modulation controller having an analog soft start input capable of controlling the output voltage from less than 0.6 volts to the desired output voltage. This combination of ramp circuits results in a desired timing of the rise and fall of voltage levels produced by each of the power converters. In general, in this embodiment, the provided ramp circuits result in the lower DC power supplies rising slower and declining slower than the higher DC power supplies, although other relative timing characteristics are specified by selection of appropriate ramp rates. In one embodiment, pulse width modulation controller 100 is an International Rectifier Model No. IRU3038. In addition, in one embodiment, pulse width modulation controller 100 is operable to both source and sink voltages over rails 22 and 24, respectively, and is a synchronous buck controller. A synchronous buck controller refers to a buck pulse width modulation controller operating both a high side FET and a low side FET. In this embodiment, pulse width modulation controller 100 includes a plurality of input and output pins. Those pins include soft start input 106, VCC input 108, VC input 110, HDRV pin 112 which provides a signal indicative of the output voltage at 22, and LDRV output 114, which provides a signal indicative of the output at node 24. A PGNP input 116, a ground input 118, an RT pin 120, a COMP pin 122, a feedback pin 124, a VP pin 126, and a V ref pin 128. COMP pin 122 is a compensation pin utilized to stabilize a central loop. Feedback pin 124 receives feedback control as desired. VP (referring to program voltage) pin 126 receives a set point for the control loop. This allows setting of a set point of the power converter. The resulting output voltage is directly proportional to any voltage supplied to VP pin 126. V ref receives a reference voltage. Operation of pulse width modulation controllers 100 are well within the knowledge of one skilled in the art and are not described in great detail here.

FIG. 3 is a circuit diagram of voltage tracking and under voltage lockout circuit 52. Circuit 52 includes an under voltage lockout circuit 202 coupled to voltage tracking circuit 203. In general, under voltage lockout circuit 202 monitors the voltage level applied at node 11, the input power supplied to power supply 10, and compares it to a reference voltage to determine whether power to power supply 106 is considered good. When power is considered to be good, in other words when the voltage level applied at node 11 is high enough, an indication to this effect is applied to voltage tracking circuit 203. In response, voltage tracking circuit 203 provides an indication over its respective output nodes 48, 50, 42, 44, and 46 to respective power converters 18, 20, 12, 14, and 16, to begin a soft start sequence. Although particular circuitry is shown for performing these functions, the circuitry illustrated in FIG. 3 may be replaced with other suitable circuitry for performing these functions.

In this example, under voltage lockout circuit 202 includes a comparator 220 that compares a signal indicative of a reference voltage applied at an input node 216 to the voltage level on node 11, supplied at the other input node 218 and generates an output signal on line 222 indicative of the difference. In performing such a function, resistors 204, 212, 208, 214, 215, and capacitors 206 and 224 are provided to select the desired threshold voltages. However, other suitable methods and circuits for generating such a voltage comparison may be used. The output of comparator 220 is provided through a resistor 26 as inputs to the gates of n-type field effect transistors 230, 232, 234, 236, and 238. Thus, when the voltage levels on the respective gates of transistors 230, 232, 234, 236, and 238 are high, these transistors turn on and provide an output over nodes 48, 50, 42, 44, and 46 indicating the output voltage should be held off or soft stopped. Conversely, when the signals on these gates are low, an open circuit is supplied over the output nodes, indicating the output should soft start or be in a normal run mode.

In operation, the voltage level supplied to power supply over node 11, normally twelve volts in this embodiment, is monitored by under voltage lockout portion 202 until it reaches its predetermined reference level close enough to twelve volts to be considered to be good. At such a time, voltage tracking portion 203 initiates a soft start procedure with each respective power controller. As described above, the control signal provided to the soft start input 106 of each respective pulse width modulator 100 of each respective power controller is ramped by ramp circuit 101, for an appropriate time. In this manner, ramping on of the power rails associated with each respective power controller is respectively ramped to generate desired voltage differences vs. time between power rail characteristics. Conversely, when power supply 10 is operating but the voltage provided at node 11 is determined not to be above the specified level (power bad), voltage tracking circuit 203 acts conversely to initiate a soft stop through ramp circuit 101.

Figure 4A:
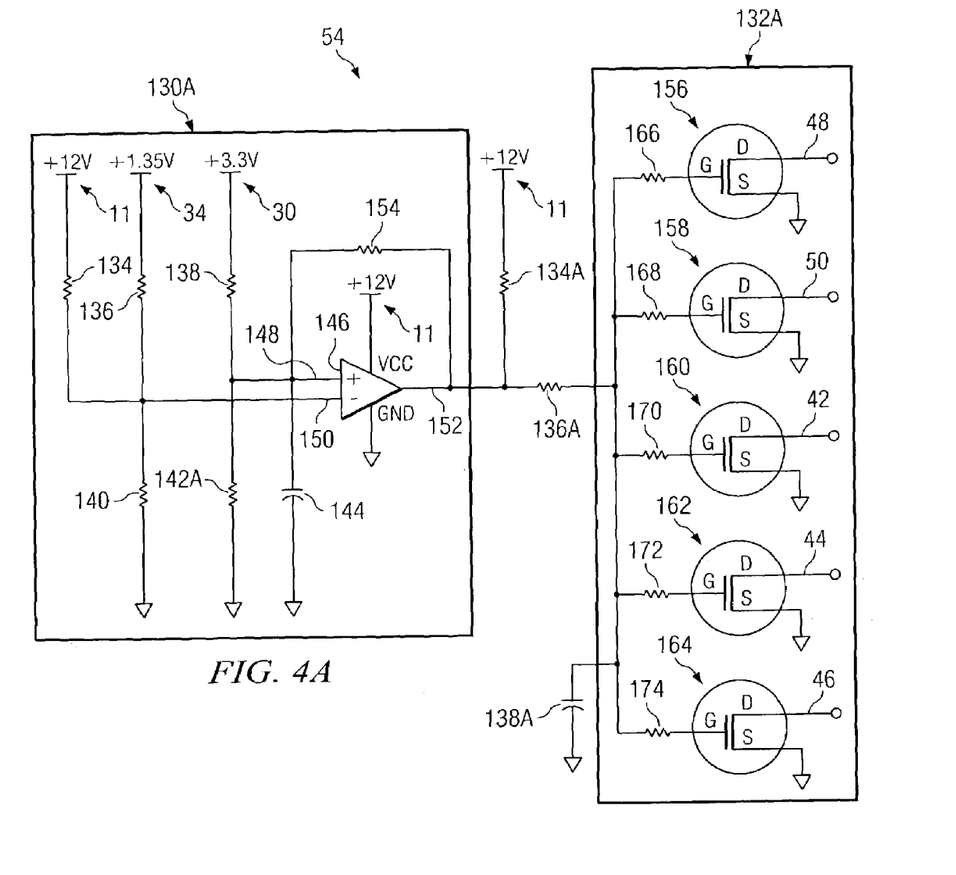
FIG. 4A is a circuit diagram illustrating a voltage differential protection circuit of FIG. 1.
Figure 4B:
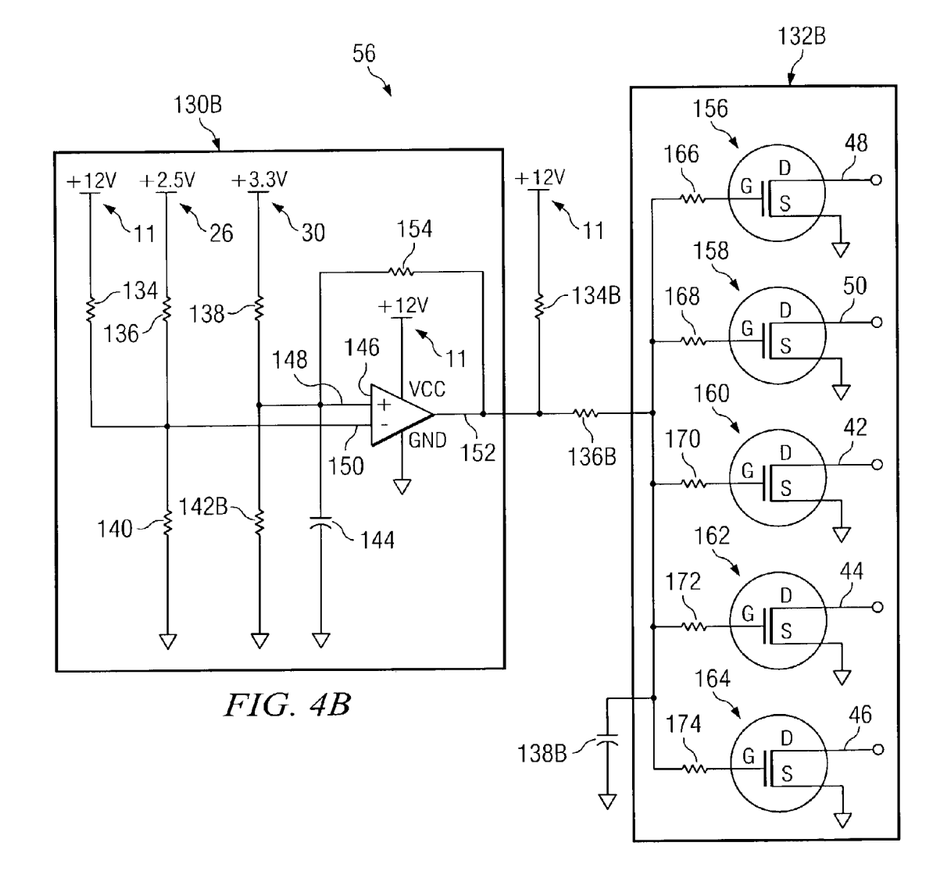
FIG. 4B is a circuit diagram illustrating a second voltage protection circuit of FIG. 1.

FIG. 4A is a circuit diagram illustrating one sided voltage differential protection circuit 54 of FIG. 1. Voltage differential protection circuit 54 provides monitoring for an unexpected failure of the power supplies to be at the proper voltage. Voltage tracking would still happen normally if this section were omitted, provided there are no fault conditions within the power supplies. One sided voltage differential protection circuit 54 includes a monitoring portion 130*a* and a voltage tracking portion 132*a*. The operation of one sided voltage differential protection circuit 54 is analogous to the operation of under voltage lockout circuit 52. In general, voltage monitoring portion 130*a* monitors the positive voltage differential between nodes 34 and 30 corresponding to power converters 18 and 16. When the voltage differential results in an undesired level, a signal is provided to the gates of the transistors within voltage tracking portion 132*a*, which in turn initiate termination of a voltage to soft start pin 106 of each respective pulse width modulator controller 100 of the respective power converters, which in turn initiates a soft stop. As described above, the termination signal is supplied through a ramp circuit, such as circuit 101, to effect relative timing of turning off the output voltages of each respective power converter. Although a particular circuit is provided, any suitable circuitry that performs the same or similar functions may be utilized.

In this particular example, monitoring portion 130*a* receives as inputs the output voltages at nodes 34 and 30 and provides signals indicative of the difference between the voltages to input nodes 148 and 150 of a comparator 146. The output of comparator 146 is provided at node 152 and signals indicative of the output are provided on the gates of each of the transistors of voltage tracking circuit 132a. Voltage tracking circuit 132a is analogous to voltage tracking circuit 203 and operates in an analogous manner. In protection circuit 130a, the resistance ratio of resistors 134, 136, 138, 140, 142A, and 154 sets the maximum allowable one sided voltage differential before asserting a fault condition.

One sided voltage differential protection 130A can be replicated, swapping power supply rails and reselecting resistors 134, 136, 138, 140, 142A, and 154 to provide an indication of a negative voltage differential, instead of the positive voltage differential indicated in FIG. 4A.

Voltage sequencing is a special case of voltage tracking, requiring an additional time delay on the rising edge of voltage tracking circuit 203.

In an alternate embodiment, the soft start input is not used, and VP pin 126 is ramped.

Figure 5:
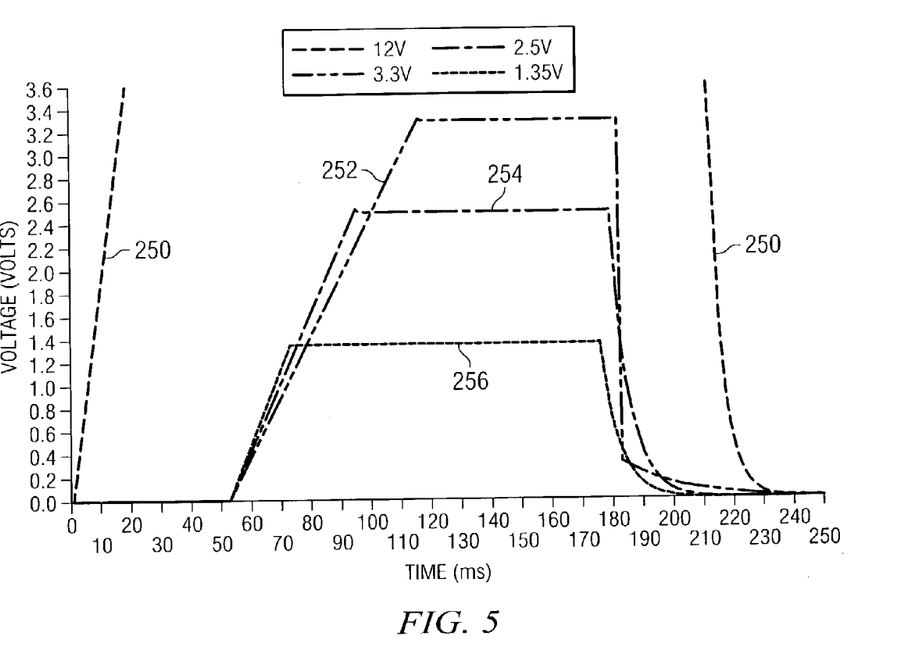
FIG. 5 is a graph of voltage versus time illustrating the rise and fall of power rails of the power supply of FIG. 1.

FIG. 5 is a graph showing the rise and fall of voltage levels over example voltage rails according to the teachings of the invention. Illustrated in FIG. 5 is a graph showing a voltage versus time curve for the voltage levels at various portions of power supply 10. Curve 250 illustrates the voltage over time characteristics of node 11, which is the input voltage to power connectors 12, 14, 16, 18, and 20. Curves 252, 254, and 256 illustrate the voltage over time characteristics at nodes 30, 26, and 34, respectively, which correspond to the output nodes of power converters 16, 14, and 18, corresponding to nominal voltage levels of 3.3 volts, 2.5 volts, and 1.35 volts, respectively. These voltage levels comply with the desired characteristics described above.

Figures 4C, 6:
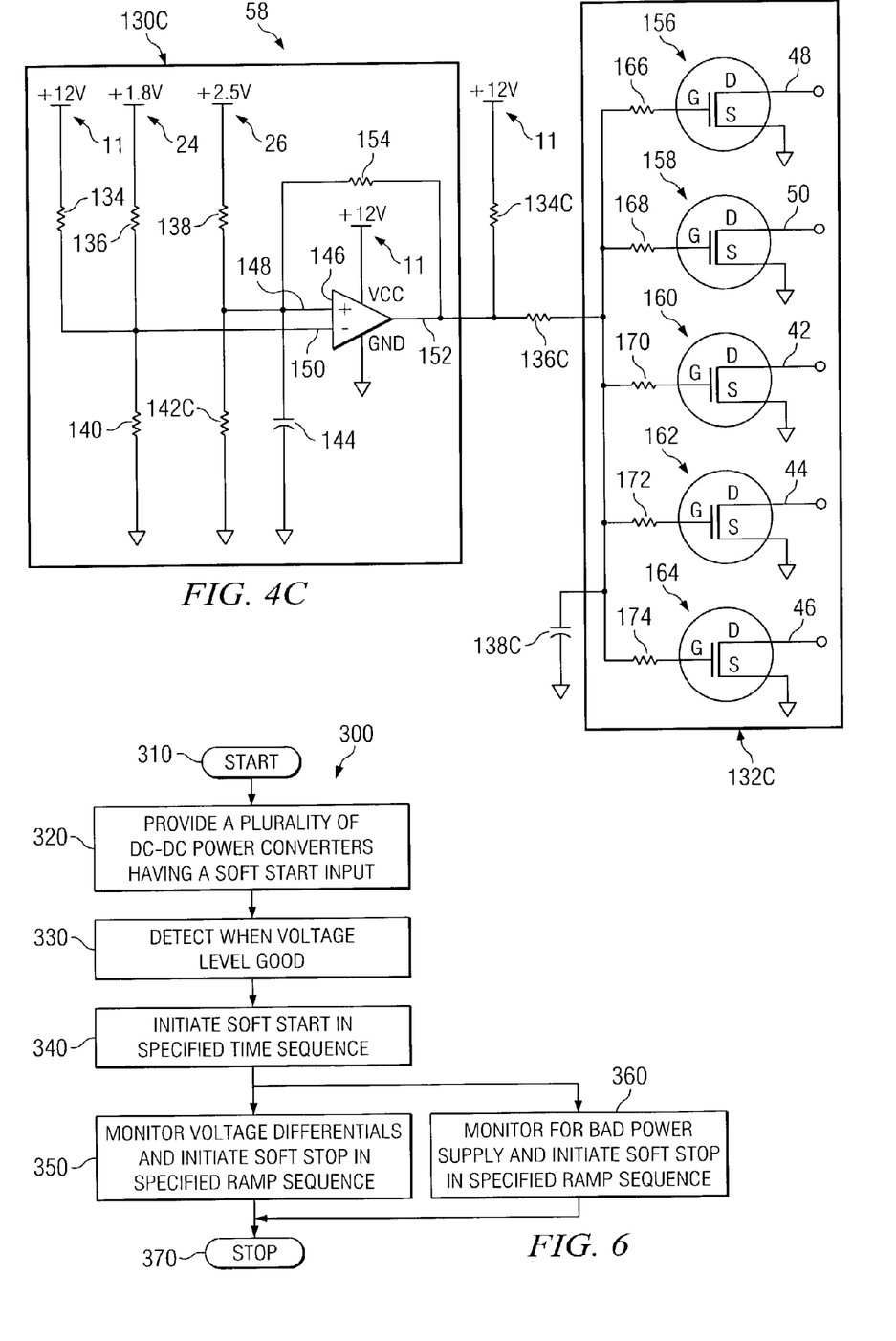
FIG. 4C is a circuit diagram illustrating a third voltage protection circuit of FIG. 1.
FIG. 6 is a flowchart illustrating a method for controlling voltage levels in a power converter.

FIG. 6 is a method for controlling voltages in a power supply. The method begins at step 310. At step 320 a plurality of DC to DC power converters having a pulse width modulator controller with soft start input and source sink capability are provided, in one embodiment. At step 330 the method detects when an input power supply to power controller reaches a particular voltage level exceeding an under voltage lockout threshold. At a step 340, after the particular level is met analog control signals are provided to each respective soft start input such that each respective power converter generates desired voltage level over time characteristics. Step 340 may include providing respective signals through respective ramp circuits having desired time constants. At step 350, the voltage differential between one or more of the pairs of the power converters is monitored and upon detection of a voltage differential exceeding a threshold, power to each of the soft start inputs of the power converters is terminated in a ramp sequence such that each respective power converter generates desired voltage levels over time characteristics. Step 350 may include providing a control signal to a soft start input of each power controller through a ramp circuit having desired time constant. Such ramp circuits may be different or the same to ramp circuits as those utilized in step 340.

Additionally, at step 360, the power supplied to the power supply may be monitored for an input power bad condition. Upon detection of a power bad condition, soft stops may be initiated by providing the appropriate control signals to the respective soft start inputs of the various power converters. The method concludes at step 370.

Thus, according to this method of the invention, desired voltage versus time characteristics may be maintained both during startup and shut down of the power supply, including monitoring for undesirable voltage differentials, and upon detection, shutting down the power supply while maintaining desired shut down sequencing and tracking, preventing any damage to delicate load integrated circuits due to improper power supply start up or shutdown.

Although some embodiments of the present invention have been described in detail, it should be understood that various changes, substitutions, and alterations can be made thereto without departing from the spirit and scope of the invention as defined by the appended claims.

What is claimed is:

1. A power supply comprising:
    a plurality of DC to DC power converters, each having a pulse width modulation controller having a soft start switch;
    a voltage tracking and under voltage lockout circuit operable to determine when a voltage level supplied to the power controller reaches predetermined levels and in response provide first control signals to each respective soft start input of the power converter;
    at least one voltage differential protection circuit operable to detect a voltage differential between voltages generated by a respective pair of the power converters, determine whether the detected voltage level meets specific criteria, and in response provide an appropriate control signal to the soft start switch of each power converter;
    a plurality of respective ramp circuits associated with respective ones of the power converters, each ramp circuit operable to:
        receive respective control signals from the voltage tracking and under voltage lockout circuit and initiate turning on or turning off of the respective power converter by providing a rising ramp control signal to each respective soft start input of the power converters according to a time constant of the ramp circuit; and
        receive respective voltage levels from the at least one voltage differential protection circuit and delay providing the second control signals to the soft start switch of the respective power converter according to a time constant of the ramp circuit.

2. The power supply of claim 1, wherein the plurality of respective ramp circuits each comprise an RC circuit.

3. The power supply of claim 2, wherein each of the plurality of respective ramp circuits have a different ramp rate than any of the other ramp circuits such that either of the first or second control signals are provided to each of the power converters at a different rate.

4. The power supply of claim 1, wherein the plurality of DC power converters comprises five power converters.

5. The power supply of claim 4, wherein the five power converters comprise a 12 volt to 1.8 volt power converter, a 12 volt to 2.5 volt power converter, a 12 volt to 3.3 volt power converter, a 12 volt to 1.35 volt power converter, and a 12 volt to 1.5 volt power converter.

6. A power supply comprising:
    a plurality of DC to DC power converters, each having a pulse width modulation controller having a soft start switch;
    a voltage tracking and under voltage lockout circuit operable to determine when a voltage level supplied to the power controller reaches predetermined levels and in response provide first control signals to each respective soft start input of the power converter;
    at least one voltage differential protection circuit operable to detect a voltage differential between voltages generated by a respective pair of the power converters, determine whether the detected voltage level meets specific criteria, and in response provide an appropriate control signal to the soft start switch of each power converter;

a plurality of respective ramp circuits associated with respective ones of the power converters, each ramp circuit operable to;

receive respective control signals from the voltage tracking and under voltage lockout circuit and provide a respective control signal to each respective soft start input of the power converters according to a time constant of the ramp circuit;

receive respective voltage levels from the at least one voltage differential protection circuit and delay providing the second control signals to the soft start switch of the respective power converter according to a time constant of the ramp circuit;

wherein the plurality of DC power converters comprises five power converters;

wherein the five power converters comprise a 12 volt to 1.8 volt power converter, a 12 volt to 2.5 volt power converter, a 12 volt to 3.3 volt power converter, a 12 volt to 1.35 volt power converter, and a 12 volt to 1.5 volt power converter; and wherein the at least one voltage differential protection circuit comprises three voltage differential protection circuits, one of the three voltage differential protection circuits monitoring a voltage differential between the 12 volt to 3.3 volt power converter and the 1.35 volt power converter, a second voltage protection circuit monitoring the voltage differential between the 12 volt to 3.3 volt power converter and the 12 volt to 2.5 volt power converter, and a third voltage differential protection circuit monitoring the voltage differential between the 12 volt to 2.5 volt power converter and the 12 volt to 1.8 volt power converter.

7. The power supply of claim 1, wherein the voltage tracking circuit comprises a plurality of field effect transistors for selectively providing the first control signals to the respective power converters.

8. The power supply of claim 1, wherein the plurality of respective voltage differential detection circuits and a plurality of transistors each operable to selectively transmit control signals to the soft start input of each power converter.

* * * * *